United States Patent
Barsness et al.

(10) Patent No.: US 10,013,460 B2
(45) Date of Patent: *Jul. 3, 2018

(54) SUPPRESSING STREAM FUNCTIONALITY TO EXPEDITE PREFERRED DATA

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 14/870,228

(22) Filed: Sep. 30, 2015

(65) Prior Publication Data

US 2016/0364451 A1    Dec. 15, 2016

Related U.S. Application Data

(63) Continuation of application No. 14/739,728, filed on Jun. 15, 2015.

(51) Int. Cl.

| | |
|---|---|
| *G06F 15/16* | (2006.01) |
| *G06F 17/30* | (2006.01) |
| *H04L 29/06* | (2006.01) |
| *H04L 29/08* | (2006.01) |

(52) U.S. Cl.
CPC .. *G06F 17/30525* (2013.01); *G06F 17/30516* (2013.01); *G06F 17/30958* (2013.01); *H04L 65/601* (2013.01); *H04L 65/608* (2013.01); *H04L 67/12* (2013.01)

(58) Field of Classification Search
None
See application file for complete search history.

(56) References Cited

U.S. PATENT DOCUMENTS

| | | |
|---|---|---|
| 8,180,914 B2 | 5/2012 | Klein |
| 2010/0185903 A1 | 7/2010 | Horn et al. |
| 2013/0031556 A1 | 1/2013 | Branson et al. |
| 2013/0198366 A1 | 8/2013 | Branson et al. |
| 2013/0290489 A1 | 10/2013 | Branson et al. |
| 2013/0290966 A1 | 10/2013 | Branson et al. |

(Continued)

OTHER PUBLICATIONS

Jiang, Q., et al., "A Framework for Supporting Load Shedding in Data Stream Management Systems", Technical Report CSE-2004-19, 2004. Department of Computer Science and Engineering, University of Texas at Arlington. 19 pages.

(Continued)

*Primary Examiner* — Joshua Joo
(74) *Attorney, Agent, or Firm* — Scott S. Dobson

(57) ABSTRACT

A controller analyzes a tuple in an operator graph. The controller determines that the tuple includes one or more selected characteristics. These characteristics signify preferred data. The controller determines operations of the operator graph which can be suppressed. The controller suppresses the one or more operations. The controller suppresses those operations in response to the tuple including one or more of the selected characteristics.

9 Claims, 7 Drawing Sheets

(56) References Cited

U.S. PATENT DOCUMENTS

| | | | |
|---|---|---|---|
| 2014/0089929 A1* | 3/2014 | Branson | H04L 29/08135 |
| | | | 718/102 |
| 2014/0136175 A1* | 5/2014 | Branson | G06F 11/34 |
| | | | 703/13 |
| 2014/0164355 A1 | 6/2014 | Branson et al. | |
| 2014/0164601 A1 | 6/2014 | Branson et al. | |
| 2015/0081645 A1 | 3/2015 | Devadhar | |
| 2016/0191466 A1 | 6/2016 | Pernicha | |

OTHER PUBLICATIONS

Mell, P., et al., "The NIST Definition of Cloud Computing", Recommendations of the National Institute of Standards and Technology. Special Publication 800-145, Sep. 2011. 7 pages.

Tu, Y., et al., "Control-Based Quality Adaptation in Data Stream Management Systems", DEXA 2005, LNCS 3588, pp. 746-755, 2005. Copyright Springer-Verlag Berlin Heidelberg 2005.

Barsness, E., et al., "Suppressing Stream Functionality to Expedite Preferred Data," U.S. Appl. No. 14/739,728, filed Jun. 15, 2015.

List of IBM Patents or Patent Applications Treated as Related, Sep. 29, 2015. 2 pages.

Barsness et al., "Suppressing Stream Functionality to Expedite Preferred Data," U.S. Appl. No. 15/813,402, filed Nov. 15, 2017.

List of IBM Patents or Patent Applications Treated as Related, dated Nov. 14, 2017. 2 pages.

\* cited by examiner

US 10,013,460 B2

SUPPRESSING STREAM FUNCTIONALITY TO EXPEDITE PREFERRED DATA

BACKGROUND

This disclosure generally relates to stream computing, and in particular, to computing applications that receive streaming data and process the data as it is received.

In traditional data processing, a controller will run queries against static data sources, resulting in generally static results. Alternatively, stream computing allows a controller to execute an effectively continuous query (e.g., a query on a stream). In this way, results may be regularly updated as data sources are updated and added to the stream.

SUMMARY

Embodiments of the disclosure provide a method, system, and computer program product for processing data. The method, system, and computer program product receive two or more tuples to be processed by a plurality of processing elements operating on one or more computer processors.

Aspects of the disclosure are directed towards suppressing streams functionality to expedite processing of preferred data. A controller may analyze a tuple in an operator graph. The controller may determine that the tuple includes one or more selected characteristics. These characteristics may signify preferred data. The controller may determine operations of the operator graph which may be suppressed. The operations may include an operator or processing element which will act upon the tuple or peripheral activities such as dynamic connections or extraneous logging which will facilitate processing the tuple. The controller may then suppress the one or more operations. The controller may both determine the operations to suppress and also suppress those operations in response to the tuple including one or more of the selected characteristics. These operations may be suppressed only in the execution of the tuple, leaving other tuples to be executed using the operations as applicable. Alternatively, the operations may be suppressed entirely in all instances until the tuple has passed through the operator graph.

Figure 1:
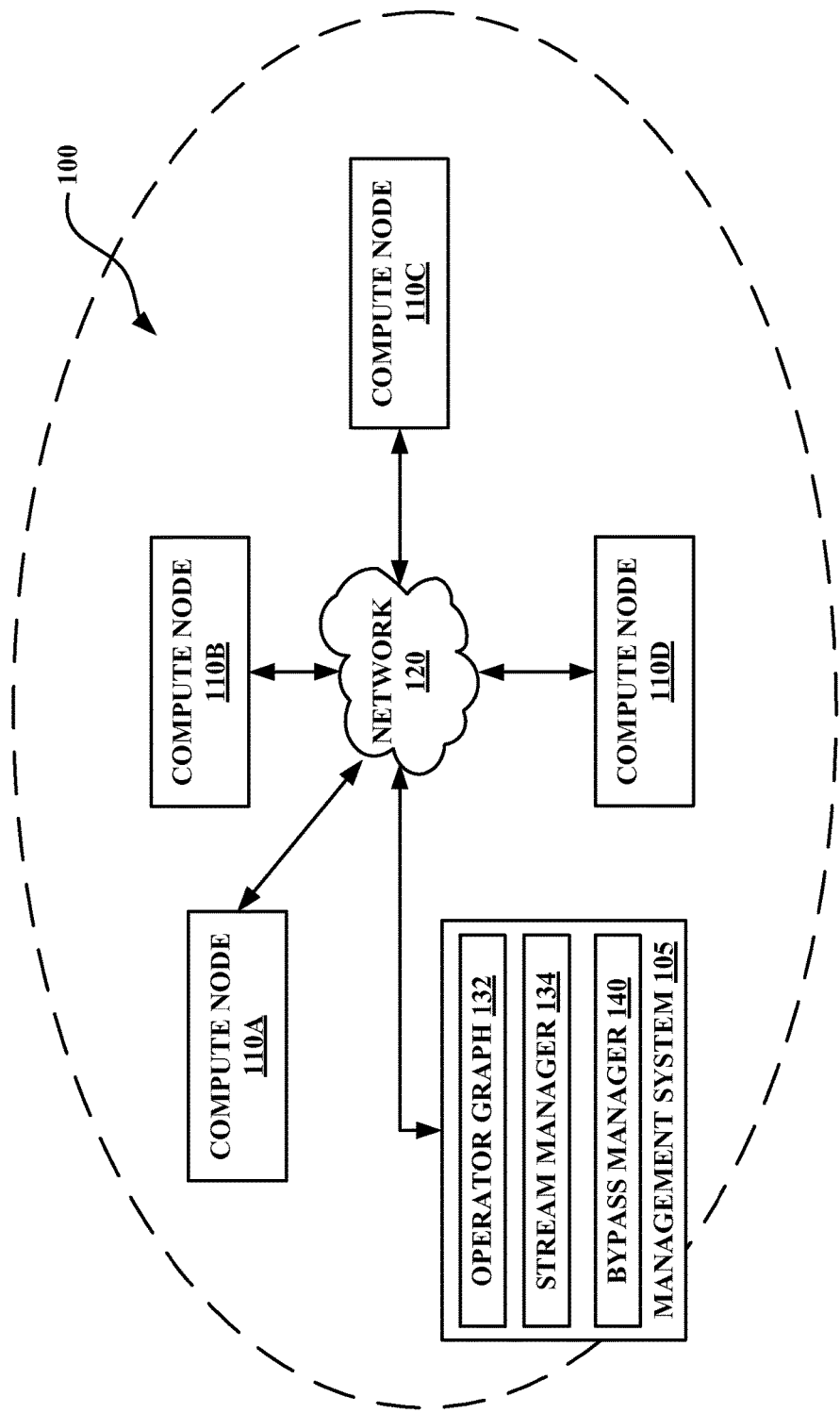
FIG. 1 illustrates a computing infrastructure configured to execute a stream computing application according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data streams, more particular aspects relate to bypassing stream functionality when certain data is present. When a streaming application processes data, some of the data may be relatively more important than other portions of the data from the perspective of an end user. A stream may therefore be monitored to identify which tuples hold these relatively more important portions of data. The stream may be monitored by a controller. The controller may determine that a tuple contains important data. As a result, the controller may suppress some streaming operations to speed up the processing of the tuple and accomplish goals of the application quicker. While the present disclosure is not necessarily limited to such applications, various aspects of the disclosure may be appreciated through a discussion of various examples using this context.

In stream computing environments, data moves from one mini-process (e.g., operator) to another. When an operator receives data, the operator may "wake up" to perform its process. These processes can include analyzing, sorting, or manipulating data in predetermined ways. Following completion of its process, the operator may transmit the data to another operator. Operators are configured in specific orders, where their mini-processes can combine to create a more complex process (e.g., processing element), which can itself be combined to create a closed process (e.g., graph, or operator graph) which would often have an end goal for how the data will be analyzed, sorted, or manipulated. Operator graphs may be configured to take data and use a number of operators/processing elements to transform the data from one form/location to another form/location, depending upon the contents of the data. For some streams, certain operators are configured only for some types of data, so a certain type of data may pass through one or more operators unchanged if those operators are not configured for that certain type. Additionally, certain operators may not be necessary but are only helpful, such as operators that clean up data, remove noise from data, or augment data into a more useful state.

New data may trigger work in a streaming system. Data may move through the streaming system as tuples. These tuples may be processed sequentially in a first-in-first-out format. The tuples may be processed by the streaming system for different applications. For applications that prioritize certain queries/conditions over others, the tuples related to those queries/conditions may be more important than others tuples. If the streaming system is working with either a long process or a large backlog of data when an "important" tuple is received, the application may not gain the benefit of processing this important tuple until the backlog is cleared and/or the long process is complete. In operator graphs with a long process, the final benefit of the tuple may be delayed by processing the tuple in ways which are not relevant or necessary to deriving the final benefit. In instances where a query is time sensitive, some benefit of an important tuple may be lost while searching for an answer which currently exists stuck in such a long process or backlog.

Aspects of the disclosure relate to monitoring tuples in an operator graph. The tuples may be analyzed to determine whether or not the tuples contain any of the data which is deemed important. Data may be deemed important because of hard coded values, reactions of the system to the data, or learned values of the system. The tuples could be analyzed for this important data by many means known in the art. Once a controller determines that a tuple contains important data, the functionality of the streaming process may be altered for the tuple. Specifically, a controller may suppress some functionality of the streaming process for the tuple. By suppressing some functionality, the controller may accelerate processing of the tuple, resulting in performance benefits for the streaming system.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In stream computing applications, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In addition, stream operators in the same operator graph may be hosted on different nodes (e.g., on different compute nodes or on different cores of a compute node).

Data flows from one stream operator to another in the form of a "tuple." A tuple is a sequence of one or more attributes associated with an entity. Attributes may be any of a variety of different types (e.g., integer, float, Boolean, string, etc.). The attributes may be ordered. In addition to attributes associated with an entity, a tuple may include metadata (i.e., data about the tuple). A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Specifically, as further described below, a break point path in an operator graph may be a point in which the output of a stream operator may be sent to one or more of a plurality of stream operators, depending upon qualities of the output. For example, a first stream operator provides its output to a second stream operator, the second stream operator provides its output to a third stream operator, and so on. The first, second, third, and additional operators can define a break point path. When a particular tuple "A" is received by the first stream operator, the corresponding tuple processed by the first stream operator is referred to herein as the same tuple A. After the tuple A is processed by the first stream operator and received by the second stream operator, the corresponding tuple processed by the second stream operator is referred to herein as the same tuple A. More generally, a tuple received by a stream operator at the head of the break point path may be referred to as the same tuple at the input and output of each subsequent stream operator in the path.

FIG. 1 illustrates one example of a computing infrastructure 100 that may be configured to execute a stream computing application, according to some embodiments. The computing infrastructure 100 includes a management system 105 and two or more compute nodes 110A-110D (i.e., hosts) which are communicatively coupled to each other using one or more communications networks 120. The communications network 120 may include one or more servers, networks, or databases, and may use a particular communication protocol to transfer data between the compute nodes 110.

The communications network 120 may include a variety of types of physical communication channels or "links." The links may be wired, wireless, optical, or any other suitable media. In addition, the communications network 120 may include a variety of network hardware and software elements for performing routing, switching, and other functions, such as routers, switches, or bridges. The communications network 120 may be dedicated for use by a stream computing application or shared with other applications and users. The communications network 120 may be any suitable size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as a time of a day, day of a week, day of a month, or a season.

The stream manager 134 may be configured to monitor a stream computing application running on compute nodes (e.g., compute nodes 110), as well as to change the deployment of an operator graph (e.g., operator graph 132). The stream manager 134 may move processing elements from one compute node 110 to another, performing such actions as managing the processing loads of the compute nodes 110 in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110.

The bypass manager 140 may determine that some data is important. When the bypass manager determines that some data is important, it may determine what streams functionality to suppress/bypass to expedite processing of the important data. The bypass manager may enact the functionality discussed in FIG. 4.

Figure 2:
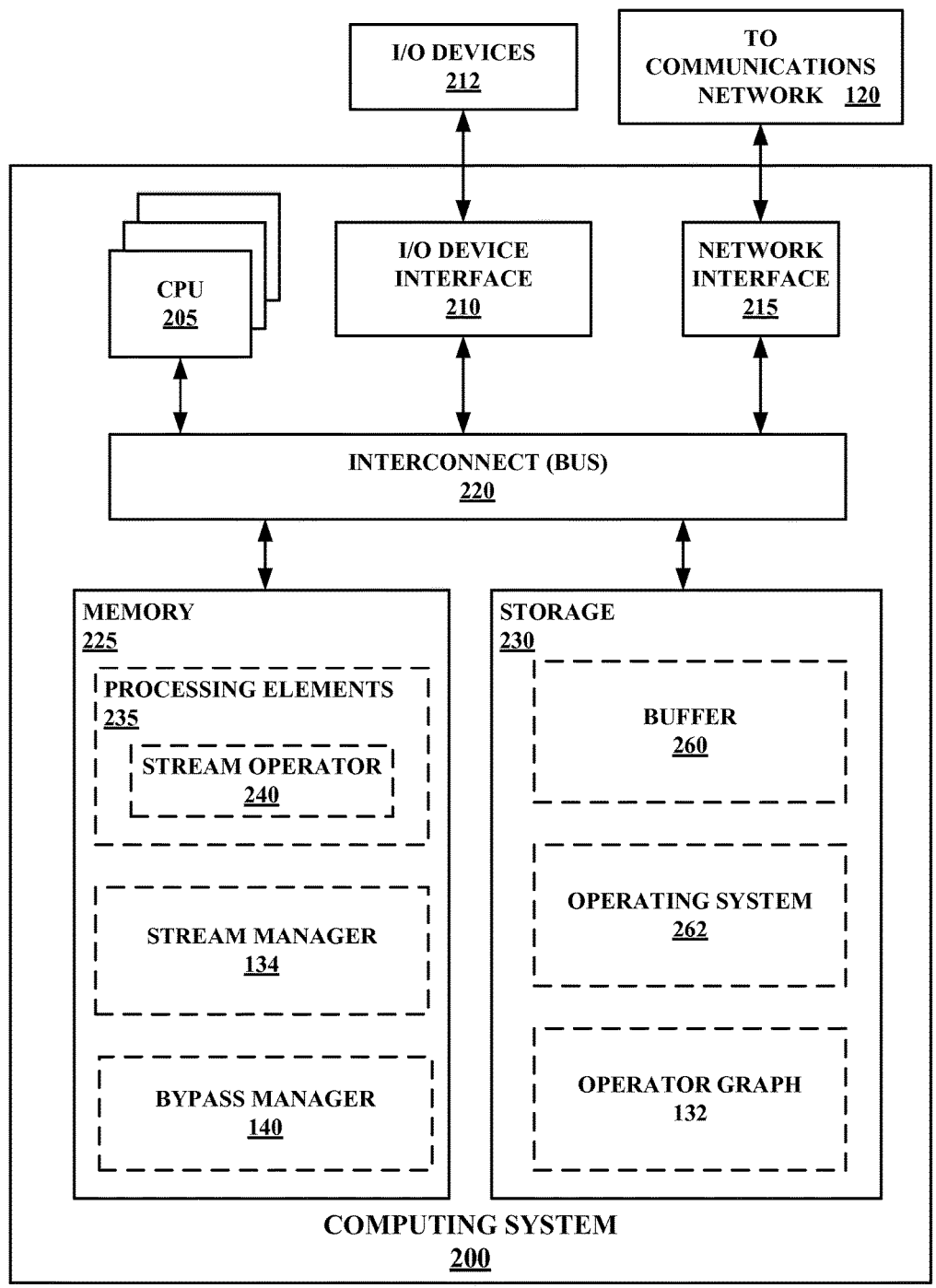
FIG. 2 illustrates computing system environment for stream computing according to various embodiments.

FIG. 2 is a view of a computing system 200. In some embodiments, the computer system 200 may be the management system 105 or one or more of the compute nodes 110 of FIG. 1. In FIG. 2, the dotted lines may be indicative of portions of FIG. 2 which are optional, or which occur in some embodiments but not others. For example, the bypass manager 140 can be included in embodiments where the computer system 200 is implemented as the management system 105, but omitted in embodiments where the computer system 200 is implemented as a computer node 110. The computing system 200 may include one or more processors (central processing units (CPUs)) 205, a network interface 215, an interconnect 220, a memory 225, and storage 230. The computing system 200 may also include an I/O device interface 210 used to connect I/O devices 212 (e.g., keyboard, display, or mouse devices) to the compute node 110. In some embodiments one or more of these components may be optional.

A CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 can be implemented using one or more busses. The CPUs 205 may be a single CPU, multiple CPUs, or a single CPU having multiple processing cores in various embodiments. In one embodiment, a processor 205 may be a digital signal processor (DSP).

The memory 225 is generally included to be representative of a random access memory (e.g., Static Random Access Memory (SRAM), Dynamic Random Access Memory (DRAM), or Flash). The storage 230 may also include non-volatile memory, such as a hard disk drive, solid state device (SSD), removable memory cards, optical storage, flash memory devices, network attached storage (NAS), connections to storage area network (SAN) devices, or other non-volatile storage devices. The network interface 215 is configured to transmit data via the communications network 120.

The memory 225 may store one or more processing elements 235. A processing element may include one or more stream operators 240 as described herein. In some embodiments, a processing element 235 can include multiple stream operators 240. Specifically, a stream computing application may include one or more stream operators 240 that may be compiled into a processing element container 235. In one embodiment, a processing element 235 is assigned to a single CPU 205 and is therein executed by that CPU 205, although in other embodiments the stream operators 240 of a processing element 235 may include one or more threads that are executed on two or more CPUs 205.

The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same computing system 200 (e.g., the same compute node 110 from FIG. 1) or on other computing systems (e.g., compute nodes) that are accessible via communications network 120. For example, a processing element 235 on a compute node 110A from FIG. 1 may output tuples to a processing element 235 on the compute node 110B from FIG. 1. The memory may include the bypass manager 140 from FIG. 1. The bypass manager 140 may enact the functionality discussed in FIG. 4. The bypass manager 140 may suppress one or more processing elements 235 or stream operators 240.

Processing elements 235 may be configured to receive or output tuples in various formats (e.g., the processing elements or stream operators could exchange data marked up as XML documents). Furthermore, each stream operator 240 within a processing element 235 may be configured to carry out data processing functions on received tuples, such as writing to database tables or performing database operations such as data joins, splits, or reads, as well as performing other data analytic functions or operations.

The storage 230 may include a buffer 260. Although shown as being in storage, the buffer 260 may alternatively be located in the memory 225 of the computing system or in a combination of both locations. Moreover, storage 230 may include storage space that is external to the computing system 200, such as in a cloud. The buffer 260 may be used when moving data to or through processing elements 235 and stream operators 240 on a compute node computing system 200.

The computing system 200 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

The memory 225 may store a stream manager 134. Additionally, the storage 230 may store an operator graph 132. The operator graph 132 may define how tuples are routed to processing elements 235 for processing. The memory 225 may store a compiler. The compiler compiles modules, which include source code or statements, into the object code, which includes machine instructions that execute on a processor. The compiler may also provide the application administrator with the ability to optimize performance through profile-driven fusion optimization. The output of the compiler may be represented by an operator graph 132.

Figure 3:
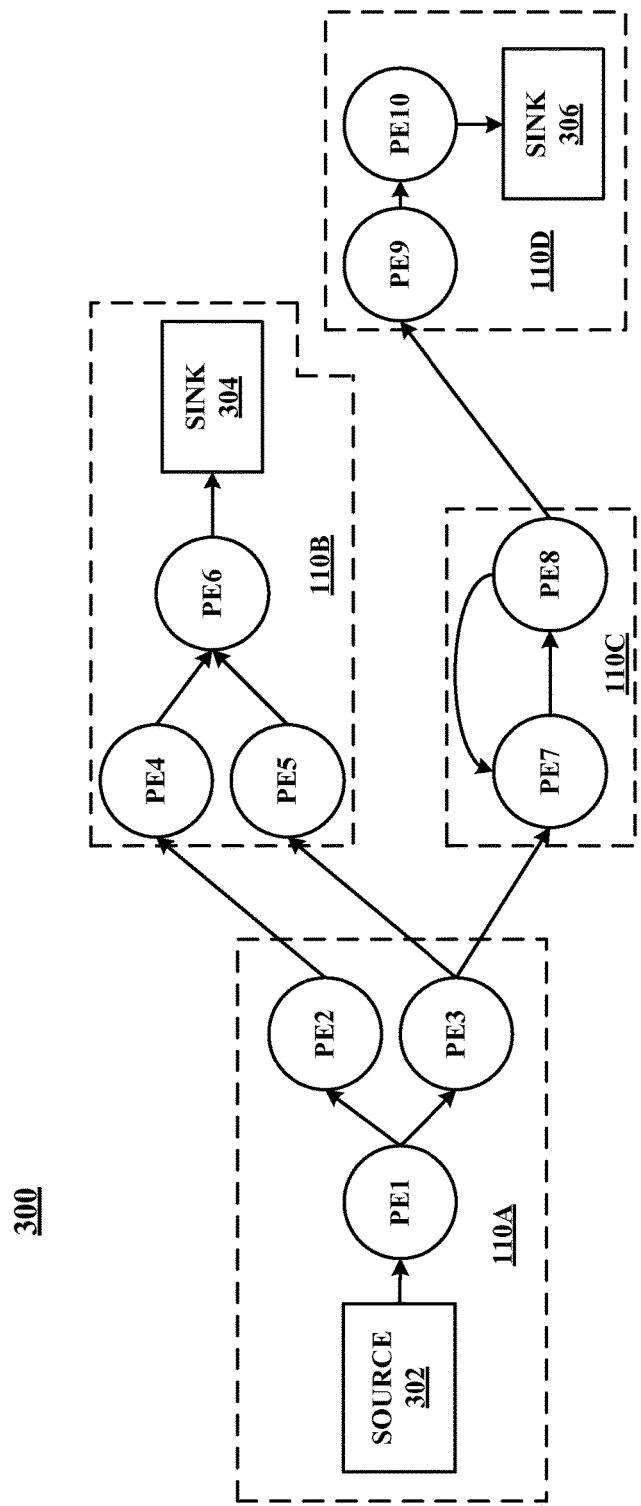
FIG. 3 illustrates an operator graph for a stream computing application according to various embodiments.

FIG. 3 illustrates an example of an operator graph 300 for a stream computing application beginning from one or more sources 302 through to one or more sinks 304, 306, according to some embodiments. This flow from source to sink may also be generally referred to herein as an execution path. In addition, a flow from one processing element to another may be referred to as an execution path in various contexts. Although FIG. 3 is abstracted to show connected processing elements PE1-PE10, the operator graph 300 may include data flows between stream operators 240 from FIG. 2 within the same or different processing elements. Typically, processing elements, such as processing element 235 from FIG. 2, both receive tuples from the stream and transmit tuples into the stream. Exceptions to this include a sink (e.g., where the stream terminates) and a source (e.g., where the stream begins). While the operator graph 300 includes a relatively small number of components, an operator graph may be much more complex and numerous operator graphs may be linked statically or dynamically together.

The operator graph shown in FIG. 3 includes ten processing elements (labeled as PE1-PE10) running on the compute nodes 110A-110D. A processing element may include one or more stream operators fused together to form an independently running process with a unique process identifier (PID) and memory space. In cases where two or more processing elements are running independently, inter-process communication may occur using a transport (e.g., a network socket, a TCP/IP socket, or shared memory). However, when stream operators are fused together, the fused stream operators can use faster communication techniques for passing tuples among stream operators in processing elements.

The operator graph 300 begins at a source 302 and ends at a sink 304, 306. Compute node 110A includes the processing elements PE1, PE2, and PE3. Source 302 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples may then be output to PE4 on compute node 110B. Likewise, the tuples output by PE4 may flow to operator sink PE6 304. Similarly, tuples flowing from PE3 to PE5 also reach the operators in sink PE6 304. Thus, in addition to being a sink for this example operator graph, PE6 could be configured to perform a joint operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, which here is PE10 306.

Because a processing element may be a collection of fused stream operators, an operator graph may have one or more execution paths between specific stream operators, which may include execution paths to different stream operators within the same processing element. FIG. 3 illustrates execution paths between processing elements for the sake of clarity.

Figure 4:
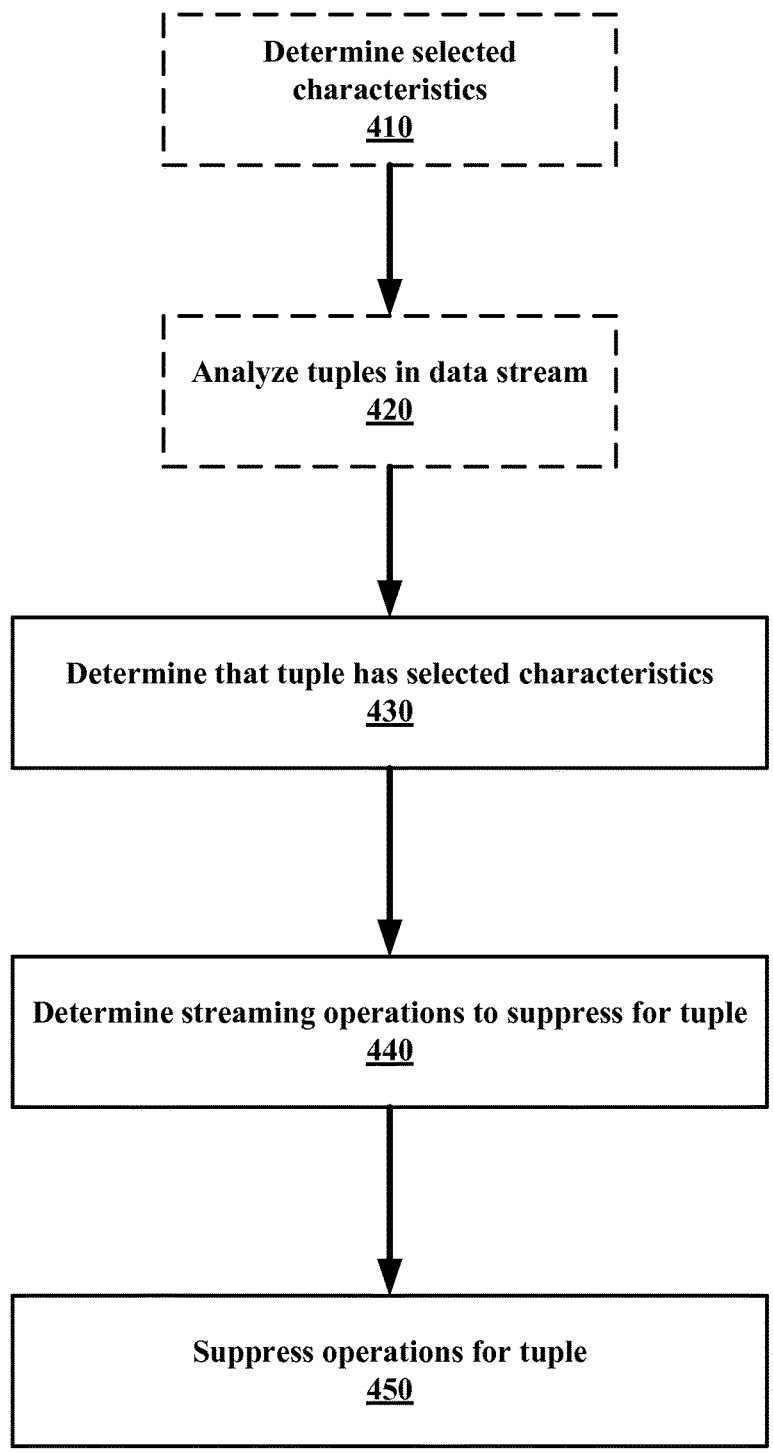
FIG. 4 illustrates a method for bypassing stream functionality according to various embodiments.

FIG. 4 is a flowchart illustrating a method 400 for suppressing streams functionality for preferred data. The stream functionality may be suppressed when data (e.g., tuples) within the data stream is identified as preferred (e.g., important). In some embodiments, tuples may be portions of data which are processed for a software application in a data stream. The visual arrangement of blocks in the flowchart of FIG. 4 is not to be construed as limiting the order in which the individual acts/operations may be performed, as certain embodiments may perform the operations of FIG. 4 in alternative orders. Blocks which are depicted with dashed lines are to be construed as optional operations.

At block 410 a controller may determine what is the selected (e.g., important) data. The controller may be a component of the streams manager. In certain embodiments, the controller could be part of the streams runtime. In the discussion of FIG. 4, important data and selected data may be used interchangeably. In some embodiments, important data may be an identifiable type of data, or data containing one or more selected or identifiable characteristics, which has been thusly identified as warranting expedited processing in relation to other data. In some embodiments, it may not be necessary to determine the important data. It may be unnecessary if data may be specified as important through hard-carded values, as a program does not need to determine something which is already hard-coded in. For example, for a program which searches through data to help locate missing children, a controller may be hard-coded to identify any data relating to "child" as important. However, a controller may determine additional important data by deriving values from this hard-coded value of "child.' Determining these derivations may include analyzing word meanings or roots (e.g., a controller may include synonyms of hard-coded values as triggers of important data). For example, a controller may determine that related words "children" and "kid" are also important and should be included in the important data.

A controller may also receive triggers from external programs to include new portions of important data. For example, using the missing children example, an external program may tabulate the names of missing children. The external program could provide this data to the controller, wherein the list of missing children could supplement the list of important data.

A controller could also determine what constitutes important data by monitoring how data behaves in the system. Specifically, a controller could identify a subset of data which meets certain conditions which correlate to important data, and add that subset of data to a list of known important data. A condition may mean that a certain type of data is more likely to end at a conspicuous conclusion (e.g., a sink which often leads to important data) in the processing chain, more likely to be deposited in a conspicuous repository (e.g., database file which often includes important data), or more likely to be queued for a conspicuous outward message (e.g., placed in a java message service (JMS) queue to a recipient which typically receives important data). For example, a controller may determine that data which includes a birthday may occasionally be matched within the system to the birthday of the missing child, which results in storing this information in a file of "found children" while preparing an outward message to authorities. The controller may match this system behavior (filing to "found children" while preparing message) corresponds to important information, and may therein add "matching birthday" to the list of important data.

At block 420 a controller may analyze tuples for selected/important data. A controller may check the tuples in response to the tuples entering an operator graph and/or the controller may check tuples after a processing element/operator has transformed said tuples. In some embodiments, transformation of a tuple may include changing the values within the tuple. In certain embodiments, the controller may analyze a tuple for important data when the tuple has not been analyzed for important data while in the current form of the tuple. Put differently, tuples may be analyzed upon both entrance into an operator graph and transformation within an operator graph. In some embodiments, an operator graph is a self-contained collection of processes which collectively receives data, performs processes upon the data, outputs the data into predetermined formats, and transmits that output data to specific locations depending upon the values of the data. In some embodiments, an operator graph may transmit more than one output, and may handle more than one source of data.

At block 430 a tuple is determined to have selected/important data. The controller may determine that the tuple has important data. A tuple could be checked for important data by a comparison of data in the tuple to data in the important data records. For example, a banking application may identify data with negative values as important data with the goal of identifying possible overdrafts. If a controller analyzes a tuple with a value of −$18.54, the controller may determine this tuple as including important data. A controller may also determine that a tuple has important data following transformation of the tuple via a transformative operator (e.g., rather than determining if a tuple is important at a source of the operator graph, the controller may determine if a tuple is important following transformations while the tuple progresses through the operator graph). For example, an incoming tuple could have a value of "withdraw $25.50 from account 1234" when entering a stream for the banking application above. Upon checking, the controller may correctly identify that this tuple has no important data. The tuple may then go to an operator A which subtracts 25.50 from the current balance 20.00 in account 1234. The operator may then transform the tuple, changing the value of the tuple to "$25.50 withdrawn from account 1234 for a balance of −$5.50." Upon analyzing this new value, the controller may determine the tuple to include important data of a negative amount.

In some embodiments, the controller may determine a tuple to include important data through conditions met by the tuple. For example, the banking application may closely track accounts when the balance falls below certain thresholds. Falling below a threshold may therefore indicate important data. Different accounts may have different thresholds, so a tuple which only includes a balance may not be sufficient to determine if the data is important. Instead, the controller may determine if a tuple is important as related to these thresholds by analyzing the behavior of relevant processes in the operator graph (e.g., if a first processing element which determines thresholds sends a tuple to a second processing element which handles compliant accounts, the tuple may be important).

For example, account 1234 may have a threshold of $100, and account 5678 may have a threshold of $75. In such embodiments, the controller may be unable to determine if a tuple is important data based only on a value of $80 in said tuple. Instead a controller may determine that the tuple includes important data when, for example, a processing element independently determines that the tuple is for account 1234 and sends the tuple to a location (e.g., a sink, processing element, database file, or JMS queue) which typically or exclusively handles data regarding accounts below their thresholds. In this way a controller may determine that a tuple includes important data by analyzing how a tuple is routed through an operator graph and/or what operations the tuple activates when passing through an operator graph.

In some embodiments, aspects of the disclosure may relate to determining that the tuple has important data by other means. These other means may be known to those skilled in the art or otherwise obvious to those skilled in the art.

At block 440, aspects of the disclosure may relate to determining streaming operations to suppress for the tuple. In some embodiments, a controller may determine the operations which can be suppressed. The operations may be determined for a tuple by a controller in response to the controller determining that the tuple included important/selected data. In some embodiments, these operations may include actions taken to process a tuple or actions taken in response to processing a tuple which can be suppressed while still deriving an anticipated result of the tuple in the operator graph. Put differently, when a tuple includes important data a controller may suppress operations and or procedures not necessary to successfully process the tuple and achieve the result which makes the tuple important.

In embodiments, operations which may be suppressed include stream operators (e.g., 240 from FIG. 2), processing elements (e.g., 235 from FIG. 2 and PE1-10 from FIG. 3), extraneous logging (e.g., records of processes, actions, performance, etc.), dynamic connections (e.g., ability to import or export mid-stream to other applications or other application instances), language cleanup functions (e.g., java garbage collection, accounting collections, optional metric collections, etc.), or other routines within an operator graph. Where a tuple would typically be transmitted to two different locations for two different purposes at the same time, a controller could suppress the transmittance of the tuple to the location which did not have the purpose which made the selected data important. Alternatively, if both purposes were equally important, the controller could allow the dual transmittance. In some embodiments, a controller could also skip the tuple ahead of other tuples in the stream, breaking the typical first-in-first-out methodology of the stream, to accelerate processing of the tuple.

The controller may know which operations to suppress by stored data related to the important data. This data could be in the form of hard-coded values or metadata on the operations. For example, a controller may determine that, when important data "A" is identified in a tuple, operations 1-6 are suppressed. In certain embodiments, a controller may suppress the same operations for any instance of important data. Alternatively, a controller may suppress different operations for different varieties of important data.

For example, an energy utility may use an energy application to process real time data regarding where energy is being consumed and generated to balance loads across a service area. The application may handle a great magnitude of data showing many loads at many locations at many times. Some of this data, such as tuples indicating unexpected spikes of electricity loads, may be more important than other portions of data, such as tuples indicating predicted loads. Some of this important data, such as when the spike is not only unexpected but also large, may be relatively more important than other important data. Within these confines, the controller may detect a small unexpected demand spike, and may determine processing elements 2 and 4 as suppressible in order to expedite processing of the small spike. Soon after this determination the controller may detect a large unexpected demand spike, and may determine processing elements 2-5, the last operator in processing element 1, and dynamic connections as suppressible for the large spike. The controller may also determine that all tuples not currently being processed may be skipped by the tuple related to the large spike to expedite processing. In this way a controller may determine which operations may be suppressed as soon as important data is detected. A controller may alternatively determine if an operation may be suppressed in response to the operation attempting to act.

In some embodiments, aspects of the disclosure may relate to determining a new route for the tuple. The new route may be different than the route the tuple would take if the tuple did not include important data. The controller may determine the new route. For example, looking at FIG. 3, the controller may determine that PE1 and PE3 are suppressible. Rather than spending the time to route the tuple to these processing elements and then determine a next location, the controller may determine a new route directly from the source 302 to PE2. Such alternate routes for tuples containing important data may be hard-coded into the streaming application prior to the detection of important data.

At block 450, aspects of the disclosure may relate to suppressing operations for the tuple. The operations determined at block 440 may be suppressed in response to determining the tuple including important data at block 430. A controller may suppress the operations. Other tuples within the operator graph which do not have important data may not have the operations suppressed, and may therein undergo the operations.

For example, a national security organization may be using a streaming application to process high volumes of data searching for a small number of high interest individuals. A portion of the data may be useful to other organizations, so dynamic connections may be enabled so that mid-stream data can be shared. At the same time, there may only be a few tuples which include data relating to the high interest individuals. The tuples may also contain time-sensitive information. Due to the high volume of data, the streaming application may also employ numerous cleanup functions and maintenance routines to ensure the stream does not collapse under the volume of data.

In this example, a controller within the streaming application may flag data relating to the high interest individuals as selected/important data. Numerous operators and processing elements may have metadata indicating if said operators and processing elements can be skipped when important data is present in a tuple. The cleanup functions and maintenance routines may all be flagged as suppressible for all important data, and dynamic connections may be suppressible for suspect A of the high interest individuals.

To further the example, the controller may be analyzing tuples in the operating graph, and may determine that a tuple exiting an operator which translates aliases into names has information concerning suspect A. The controller may determine that this tuple, due to its inclusion of suspect A, has important data. At this point a tax collection application may attempt to use dynamic connections to reference the tuple as it exited the alias operator. The controller may suppress this attempt to expedite processing of the tuple. However, the controller may allow the tax collection application to export a tuple immediately following the tuple regarding suspect A. At the same time, a maintenance routine may attempt java garbage collection, and in response the controller may suppress the action across the operator graph, therein suppressing all such maintenance until the tuple has concluded processing on the operator graph. The tuple may then be routed from operator to operator, with the controller suppressing numerous operations along the route as metadata allows. When a processing element has metadata indicating that all operators are suppressible, the controller may suppress the entire processing element. If the tuple comes to a hard-coded route to skip operations due to the important data, the controller may route the tuple along this hard-coded path. In this way the controller may react to important data in tuples by suppressing streams functionality to realized performance benefits.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
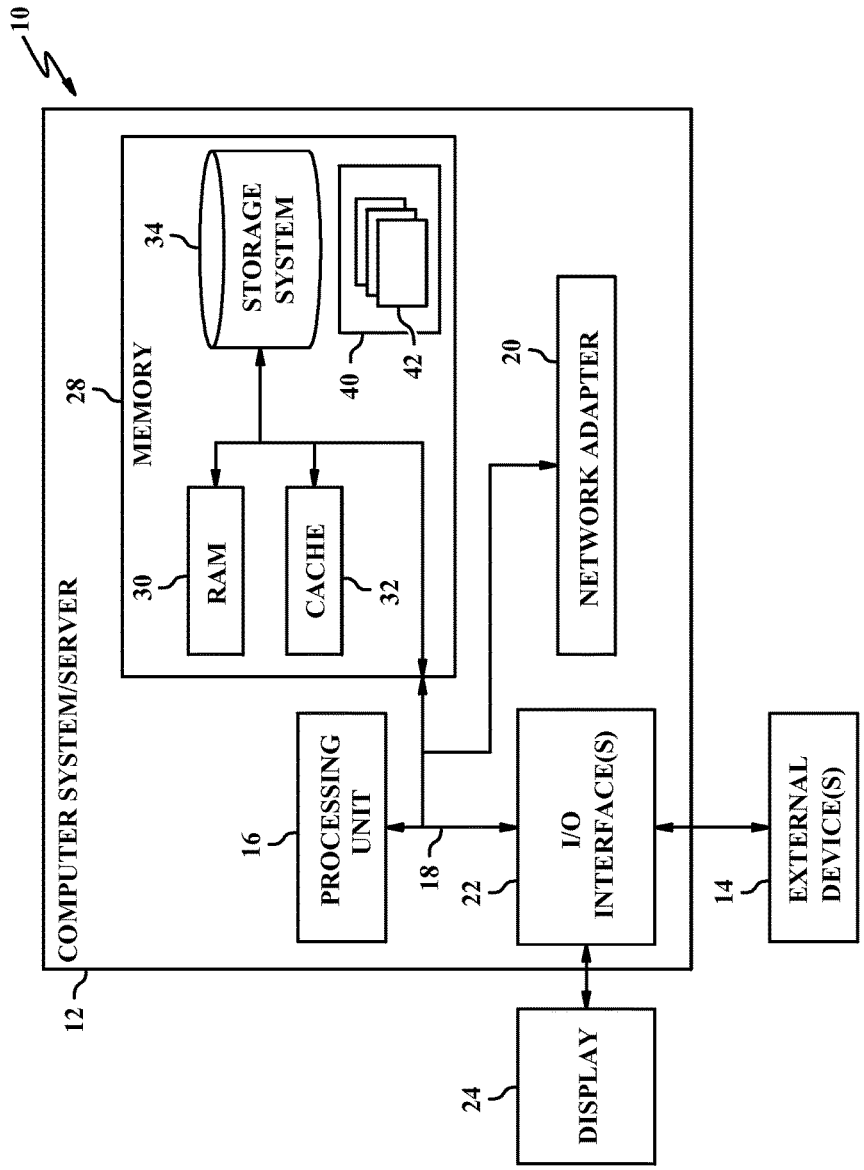
FIG. 5 illustrates a cloud computing node according to various embodiments.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
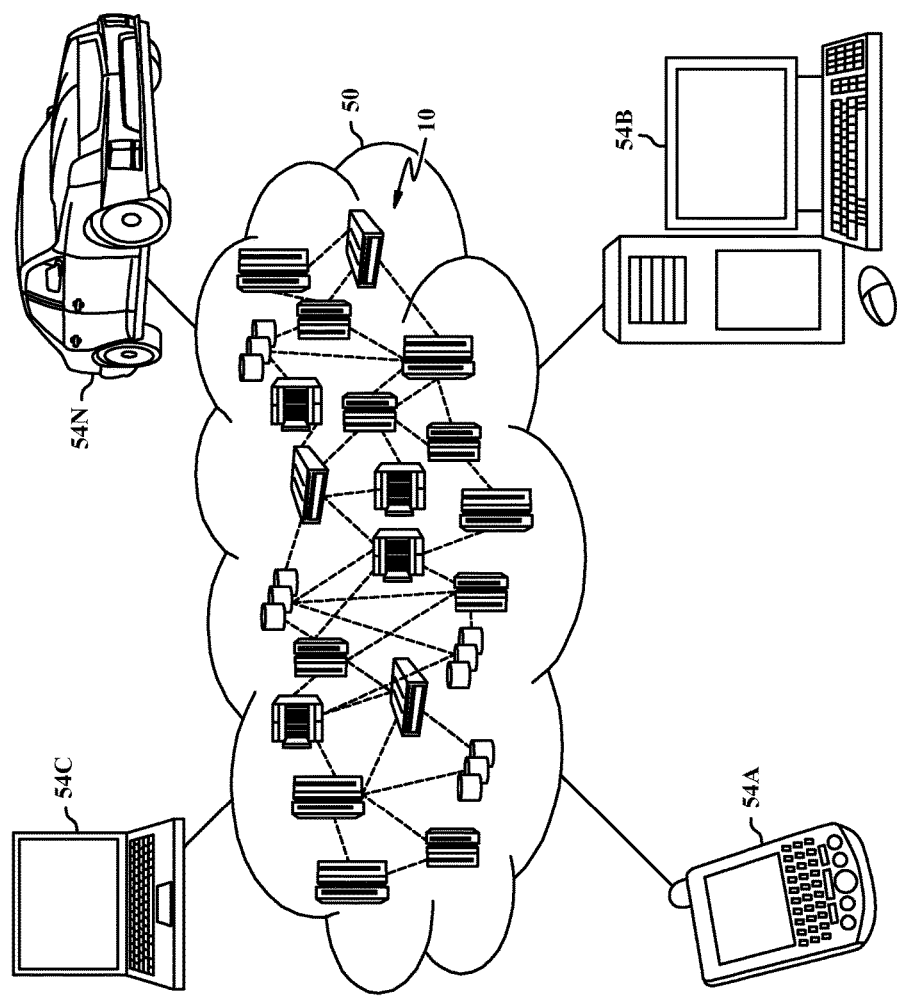
FIG. 6 illustrates a cloud computing environment according to various embodiments.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
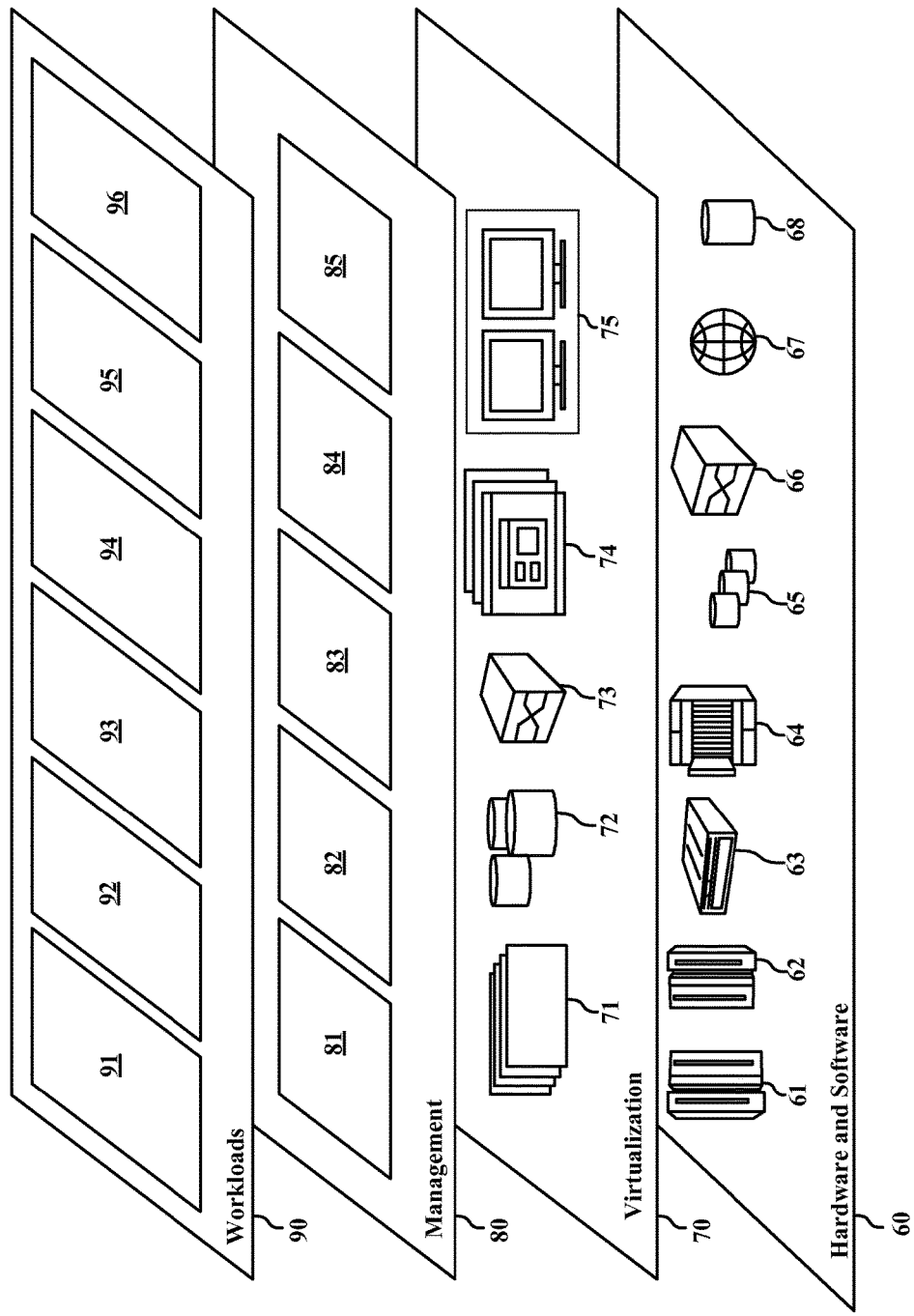
FIG. 7 illustrates abstraction model layers according to various embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stream functionality suppression. Stream functionality suppression may detect that important data (e.g., data which is relatively more important than other data) is present somewhere in the data stream of the cloud computing environment. In response to detecting this important data, certain stream functionalities of the cloud computing environment may be suppressed. By suppressing certain stream functionalities of the cloud computing environment, the important data may be processed more quickly, allowing components of the cloud computing environment to receive the benefits of this important data more expediently.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing selected data in a data stream, the method comprising:
   determining, by analyzing a first tuple in an operator graph, that the first tuple includes one or more selected characteristics from a set of selected characteristics, the set of selected characteristics consisting of characteristics indicative of data for expedited processing, the set of selected characteristics comprising hard-coded characteristics and learned characteristics;
   determining, in response to determining that the first tuple includes the one or more selected characteristics, one or more operations of the operator graph which are suppressible;
   suppressing, in response to determining that the first tuple includes the one or more selected characteristics, the one or more operations for processing of the first tuple;
   determining, by analyzing a second tuple in the operator graph, that the second tuple includes different selected characteristics from the set of selected characteristics, the different selected characteristics being different from the one or more selected characteristics of the first tuple;
   determining, in response to determining that the second tuple includes the different selected characteristics, a different set of operations of the operator graph which are suppressible, the different set of operations being different from the one or more operations which are suppressible; and
   suppressing, in response to determining that the second tuple includes the different selected characteristics, the different set of operations for the second tuple.

2. The method of claim 1, further comprising:
determining a new processing route comprising a new set of processing elements for the first tuple to be routed to in the operator graph, wherein the new set of processing elements avoids a set of the one or more operations; and
routing the first tuple to the new set of processing elements.

3. The method of claim 1, wherein the one or more selected characteristics of the first tuple are generated within the operator graph.

4. The method of claim 1, further comprising:
analyzing how tuples without characteristics from the set of selected characteristics are processed within the operator graph;
detecting that a subset of tuples without more characteristics from the set of selected characteristics end the subset's processing chain with a same operation as tuples containing one or more characteristics from the set of selected characteristics;
determining a common characteristic among the subset of tuples; and
adding the common characteristic as a learned characteristic to the set of selected characteristics.

5. The method of claim 4, wherein the same operation is performed by a sink operator.

6. The method of claim 4, wherein the same operation is depositing tuple data in a same repository.

7. The method of claim 4, wherein the same operation is queuing tuple data for an outward message to a same recipient.

8. The method of claim 1, wherein the determining the one or more operations of the operator graph which are suppressible comprises identifying metadata for a processing element, the metadata indicating which operators of the processing element are suppressible.

9. The method of claim 1, further comprising:
receiving new characteristics indicative of data for expedited processing from an external program; and
adding the new characteristics to the set of selected characteristics.

* * * * *